(12) United States Patent
Kim et al.

(10) Patent No.: US 9,074,081 B2
(45) Date of Patent: Jul. 7, 2015

(54) ECO-FRIENDLY RESIN COMPOSITION

(71) Applicant: Hyundai Motor Company, Seoul (KR)

(72) Inventors: Hak Soo Kim, Seoul (KR); Dae Sik Kim, Gyeonggi-do (KR); Han Ki Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 209 days.

(21) Appl. No.: 13/724,773

(22) Filed: Dec. 21, 2012

(65) Prior Publication Data

US 2014/0051783 A1 Feb. 20, 2014

(30) Foreign Application Priority Data

Aug. 16, 2012 (KR) ........................ 10-2012-0089681

(51) Int. Cl.
*C08L 1/12* (2006.01)
*C08L 23/10* (2006.01)

(52) U.S. Cl.
CPC . *C08L 1/12* (2013.01); *C08L 23/10* (2013.01); *C08L 2205/08* (2013.01)

(58) Field of Classification Search
USPC ......................................... 525/56, 57, 60, 61
See application file for complete search history.

(56) References Cited

FOREIGN PATENT DOCUMENTS

| JP | 2011-132439 A | 7/2011 |
| JP | 2011-208103 A | 10/2011 |
| JP | 2011-225845 A | 11/2011 |
| JP | 2011-241236 A | 12/2011 |
| KR | 10-2007-0069183 A | 7/2007 |
| KR | 10-2011-0051575 | 5/2011 |

OTHER PUBLICATIONS

Fuji Film, electronic translation of JP 2011-225845, (Oct. 2011).*

* cited by examiner

*Primary Examiner* — Jeffrey Mullis
(74) *Attorney, Agent, or Firm* — Mintz Levin Cohn Ferris Glovsky and Popeo, P.C.; Peter F. Corless

(57) ABSTRACT

Disclosed is an eco-friendly resin composition. The eco-friendly resin composition includes a base resin of about 100 parts by weight and a polyvinylacetal compatibilizer of about 1 to about 20 parts by weight. The base resin includes a plasticized cellulose diacetate of about 10 wt % to about 50 wt % and a thermoplastic resin of about 50 wt % to about 90 wt %.

16 Claims, No Drawings

ECO-FRIENDLY RESIN COMPOSITION

CROSS-REFERENCE TO RELATED APPLICATION

This application claims under 35 U.S.C. §119(a) the benefit of Korean Patent Application No. 10-2012-0089681, filed Aug. 16, 2012, the entire contents of which are incorporated herein by reference.

BACKGROUND (a) Technical Field

The present invention relates to an eco-friendly resin composition. More particularly, the present invention relates to an eco-friendly resin composition with excellent mechanical properties, which may replace typical synthetic resins (e.g., polypropylene) for use in vehicle interior parts.

(b) Background Art

Many industries of the developed countries of the world economy are continuing efforts to replace oil-based material sources with natural materials and eco-friendly materials based on, e.g., crop resources. Additionally, there is an increasing interest in many countries to find and develop eco-friendly materials as a result of new environmental laws, social interests, and increasingly changing perceptions about the environment.

Recent research by many automakers has found that substitution of existing materials with eco-friendly materials may have a number of advantages such as, for example, preventing depletion of oil resources, reducing $CO_2$ emissions and volatile organic matter production, and promoting the rate of recycling.

An example eco-friendly material is Poly Lactic Acid (PLA), which is typically used as an eco-friendly material for vehicle interior parts. PLA, which is manufactured by fermenting and polymerizing a corn extract, was first commercialized as a bioplastic material. However, the use of PLA has several drawbacks. For example, PLA has poor physical properties, so it is not useful for use in vehicle applications that require a material with high impact resistance; consequently, it is primarily used for vehicle interiors. Additionally, the raw materials used to produce PLA are food resources, and their use for material production has become a social issue with negative aspects. Thus, there is a need to develop bio materials with improved physical properties that may be produced by sustainable and socially acceptable production techniques.

SUMMARY OF THE DISCLOSURE

The present invention provides an eco-friendly plastic composition with excellent mechanical properties.

In one aspect, the present invention provides an eco-friendly resin composition, including: a base resin of about 100 parts by weight including a plasticized cellulose diacetate of about 10 wt % to about 50 wt % and a thermoplastic resin of about 50 wt % to about 90 wt %; and a polyvinylacetal compatibilizer of about 1 to about 20 parts by weight.

In another aspect, the present invention provides an eco-friendly resin composition, including: a base resin of about 100 parts by weight including a plasticized cellulose diacetate of about 10 wt % to about 50 wt % and a thermoplastic resin of about 50 wt % to about 90 wt %; a polyvinylacetal compatibilizer of about 1 part by weight to about 20 parts by weight; an inorganic filler bonded with a silane coupling agent, the inorganic filler ranging from about 1 part by weight to about 40 parts by weight; and an elastomer grafted with a maleic anhydride, the elastomer ranging from about 1 to about 30 parts by weight.

In an exemplary embodiment, the plasticized cellulose diacetate may have a weight-average molecular weight of about 200,000 to about 500,000.

In another exemplary embodiment, the thermoplastic resin may include one or more olefins (e.g., an alkene) such as, for example, ethylene, propene, butene, pentene, hexene, cyclohexene, etc.

In still another exemplary embodiment, the thermoplastic resin may include a polyolefin resin such as, for example, polyethylene, polypropylene, polymethylpentene, polybutene-1.

In yet another exemplary embodiment, the polyvinylacetal compatibilizer may have a degree of acetalization of about 45 mol % to about 85 mol %.

In still yet another exemplary embodiment, the silane coupling agent bonded to the inorganic filler may include one or more selected from the group consisting of n-butyltrimethoxysilane, n-butyltriethoxysilane, n-hexyltrimethoxysilane, n-hexyltriethoxysilane, n-octyltrimethoxysilane, n-octyltriethoxysilane, n-octyltripropoxysilane, vinyltriethoxysilane, vinyltrimethoxysilane, vinyltris (β-methoxy-ethoxysilane), gamma-glycidoxypropyltrimethoxysilane, and gamma-aminopropyltriethoxysilane.

In a further exemplary embodiment, the maleic anhydride-grafted elastomer may include one or more selected from the group consisting of maleic anhydride grafted polyethylene (MA-g-PE), maleic anhydride grafted polypropylene (MA-g-PP), maleic anhydride grafted ethylene-propylene rubber (MA-g-EPR), maleic anhydride grafted ethylene-octene rubber(MA-g-EOR), and maleic anhydride grafted ethylene-propylene-diene monomer rubber (MA-g-EPDM).

In another further exemplary embodiment, the eco-friendly resin composition may further include one or more additives selected from the group consisting of a flame retardant, a lubricant, an antioxidant, a light stabilizer, a release agent, a pigment, an antistatic agent, an antimicrobial agent, a processing aid, a metal deactivator, a smoke suppressant, a fluorine anti-dropping agent, an inorganic filler, a glass fiber, a friction-resistant agent, an anti-wear agent, and a coupling agent.

In still another aspect, the present invention provides a product formed of the resin compositions described above.

Other aspects and exemplary embodiments of the invention are discussed infra.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20,21, 22, 23, 24, 25, 26, 27,28, 29, 30, 31, 32, 33, 34, 35, 36, 37,38,39,40, 41, 42, 43, 44, 45, 46, 47, 48, 49, or 50, as well as all intervening decimal values between the aforementioned integers such as, for example, 1.1, 1.2, 1.3, 1,4, 1,5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0,1%, 0.05%, or 0.01% of the stated value, Unless otherwise clear from the context, all numerical values provided herein are modified by the term "about."

The present invention relates to a resin composition, which includes a polyvinylacetal compatibilizer in addition to a base resin including a plasticized cellulose diacetate (CDA) and a thermoplastic resin.

In order to improve the resin's mechanical properties and thermal characteristics, the resin composition may include an inorganic filler bonded with a silane coupling agent, and an elastomer grafted with a maleic anhydride in a particular content ratio in addition to the base resin and the polyvinylacetal compatibilizer. Without being bound by any particular theory, the particular content ratio of the polyvinylacetal compatibilizer added to the resin composition, the inorganic filler bonded with the silane coupling agent, and the elastomer grafted with the maleic anhydride may be an important factor in determining the properties of the resin composition.

Hereinafter, the particular content ratio of a resin composition according to an exemplary embodiment of the present invention will be described in more detail as follows.

In this exemplary embodiment, plasticized cellulose diacetate of about 10 wt % to about 50 wt % and thermoplastic resin of about 50 wt % to about 90 wt % may be used as a base resin.

Plasticized cellulose diacetate (CDA), which constitutes the biomass of the base resin, may be used after a typical acetylation reaction and plasticization reaction of cellulose obtained from a bio-source such as, for example, wood. The cellulose diacetate may include three hydroxyl groups (—OH) in a pyranose ring, which may be substituted with an average of 2 acetyl groups. More specifically, the three hydroxyl groups may be substituted with about 1.5 to about 2.5 acetyl groups. According to the techniques herein, the acetyl groups may be plasticized using a plasticizer such as, for example, glycerin and triacetin.

The weight-average molecular weight (Mw) of the plasticized cellulose diacetate may be about 200,000 Mw or more. More preferably, the weight-average molecular weight may range from about 200,000 Mw to about 500,000.

Olefin resins (e.g., ethylene, propene, butene, pentene, hexene, cyclohexene, polyethylene, polypropylene, polymethylpentene, polybutene-1, etc.) may be used as the thermoplastic resin of the base resin, and polypropylene (PP) may be used as typical thermoplastic resin.

If the content of the plasticized cellulose diacetate is smaller than about 10 wt %, the eco-friendly may not possess the desired material properties. On the other hand, if the content of the plasticized cellulose diacetate is greater than about 50 wt %, it may be difficult or impossible to obtain a resin composition having the mechanical properties and the heat characteristics according to the exemplary embodiments of the present invention.

The polyvinylacetal compatibilizer may be used to increase the compatibility between plasticized cellulose diacetate and thermoplastic resin used as the base resin.

Polyvinylacetal may be a homopolymer of a vinylacetal repeating unit or a copolymer of a vinylacetal repeating unit and other comonomer repeating unit. Also, polyvinylacetal may be manufactured by an acetylation reaction of a vinylalcohol polymer and an aldehyde compound. Acetylation may be performed by a well-known method, for example, by a method of reacting a vinylalcohol polymer with an aldehyde compound an acidic catalyst. The acidic catalyst used for acetylation may be, for example, either an organic acid or inorganic acid. For example, such catalysts may include acetic acid, p-toluene sulfonic acid, nitric acid, sulfuric acid, hydrochloric acid, etc. Generally, hydrochloric acid, sulfuric acid, or nitric acid may be used. More preferably, hydrochloric acid may be used.

Aldehyde compounds having 2 to 6 carbons may be used for acetylation. The aldehyde compound may be selected from the group consisting of acetaldehyde, propionaldehyde, n-butyraldehyde, isobutyl aldehyde, n-hexylaldehyde, 2-ethylbutylaldehyde, and any combination thereof.

In this exemplary embodiment, the degree of acetalization of the polyvinylacetal may range from about 40 mol % to about 85 mol %, and more preferably, from about 50 mol % to 85 mol %. In other words, about 40 mol % to about 85 mol %, or about 45 mol % to about 85 mol %, or about 50 mol % to 85 mol %, of the polyvinylacetal compatibilizer may be acetalized. When the degree of acetalization falls within the above range, the compatibility may be maximized.

The polyvinylacetal compatibilizer may be used in a range from about 1 part by weight to about 20 parts by weight with respect to 100 parts by weight of base resin. When the quantity of the compatibilizer is too small, the properties of the resin such as elongation and low temperature characteristics may be reduced. When the quantity of the compatibilizer is too large, the properties of the resin such as elongation and low temperature characteristics may increase, but the material properties may be deteriorated.

Also, in order to uniformly disperse the plasticized cellulose diacetate into the thermoplastic resin, an inorganic filler surface-treated with silane may be used. In this case, the inorganic filler may be one or more selected from the group consisting of talc, silica, kaolin, mica, alumina, wollastonite, clay, and calcium carbonate. The average particle size of the inorganic filler may range from about 2 μm to about 10 μm.

The silane coupling agent used for the surface treatment of the inorganic filler may include an alkyl group of 1 to 10 carbons, an alkoxy group of 1 to 10 carbons, and an alkenyl group of 2 to 10 carbon number, in which a silane compound with at least one substituted alkoxy group may be used.

The silane coupling agent may be one or more selected from the group consisting of n-butyltrimethoxysilane, n-butyltriethoxysilane, n-hexyltrimethoxysilane, n-hexyltriethoxysilane, n-octyltrimethoxysilane, n-octyltriethoxysilane, n-oetyltripropoxysilane, vinyltriethoxysilane, vinyltrimethoxysilane, vinyltris (β-methoxy-ethoxysilane), gamma-glycidoxypropyltrimethoxysilane, and gamma-aminopropyltriethoxysilane.

The inorganic filler surface-treated with silane may be less than about 40 parts by weight with respect to 100 parts by weight of base resin, and preferably, may be used in a range from about 1 part by weight to about 40 parts by weight.

Also, elastomer grafted with maleic anhydride may be used in order to increase the composition's mechanical properties (e.g., flexural modulus and tensile strength). Specifically, one or more maleic anhydride grafted elastomers selected from the group consisting of maleic anhydride grafted polyethylene (MA-g-PE), maleic anhydride grafted polypropylene (MA-g-PP), maleic anhydride grafted ethylene-propylene rubber (MA-g-EPR), maleic anhydride grafted ethylene-octene rubber(MA-g-EOR), and maleic anhydride grafted ethylene-propylene-diene monomer rubber (MA-g-EPDM) may be used.

The maleic anhydride used as an elastomer modifier may be grafted in a range from about 0.1 wt % to about 5 wt % based on the weight of the elastomer in order to achieve the desired effects of the present invention as described herein. The elastomer grafted with maleic anhydride may be less than about 30 parts by weight with respect to 100 parts by weight of base resin, and preferably, may be used in a range from about 1 part by weight to about 30 parts by weight.

Also, the resin composition may additionally include one or more additives selected from the group consisting of a flame retardant, a lubricant, an antioxidant, a light stabilizer, a release agent, a pigment, an antistatic agent, an antimicrobial agent, a processing aid, a metal deactivator, a smoke suppressant, a fluorine anti-dropping agent, an inorganic filler, a glass fiber, a friction-resistant material, an anti-wear agent, and a coupling agent. The additives may be typical materials that are being widely used in this art, and the embodiments are not limited to the selection or contents thereof. In this case, eco-friendly products may be preferentially used.

Also, it is contemplated that products molded using the above resin compositions by typical methods may be included in the scope of the present invention. More specifically, the resin composition may be extruded to make pellets at a process temperature of about 210° C. to about 230° C., and then the pellets may be injection-molded to obtain vehicle interior parts.

Hereinafter, exemplary embodiments will be described in more detail, but the embodiments described below should not be construed as limiting the scope of the present invention.

EXAMPLES

The following examples illustrate the invention and are not intended to limit the same.

Examples 1 to 6 and Comparative Example 1

In order to examine the effects of adding a polyvinylacetal compatibilizer to a base resin including plasticized cellulose diacetate and thermoplastic resin, resin compositions were manufactured according to the components and the weight ratio shown Table 1 below. The properties of the resin compositions were measured by the below-described method are shown in Table 1.

[Physical Properties Measurements Method]

Tensile strength was measured by ASTM D-638 (specimen 12.7×12.7×3.2 mm).

Elongation was measured by ASTM D-638 (specimen 12.7×12.7×3.2 mm).

Flexural modulus and flexural stress were measured by ASTM D-790 (specimen 12.7×12.7×6.4 mm).

IZOD impact strength was measured by ASTM D-256 (specimen 63.5×12.7×6.4 mm, room temperature 23° C.).

TABLE 1

| Division | | | Comparative example 1 | Examples 1 | 2 | 3 | 4 | 5 | 6 |
|---|---|---|---|---|---|---|---|---|---|
| Composition (g) | polypropylene[1] | | 70 | 70 | 70 | 70 | 80 | 60 | 70 |
| | plasticized CDA[2] | | 30 | 30 | 30 | 30 | 20 | 40 | 30 |
| | Polyvinylacetal compatibilizer[3] | | — | 5 | 10 | 15 | 20 | 20 | 20 |
| | stabilizer[4] | | 0.5 | 0.5 | 0.5 | 0.5 | 0.5 | 0.5 | 0.5 |
| Property | Tensile strength (Mpa) | | 34 | 34 | 33 | 33 | 32 | 36 | 31 |
| | Elongation (%) | | 15 | 38 | 43 | 86 | 97 | 54 | 82 |
| | IZOD impact strength (kgfcm/cm) | 23° C. | 3.4 | 4.5 | 6.3 | 8.3 | 10.5 | 7.1 | 8.3 |
| | | −10° C. | 2.1 | 2.8 | 3.9 | 5.3 | 6.4 | 4.9 | 5.1 |

[1]polypropylene: polymirae, EA5074
[2]plasticized cellulose diacetate: plasticized to weight-average molecular weight of 284,750 g/mol
[3]Polyvinylacetal compatibilizer: degree of acetylation 75 mol %
[4]stabilizer: 3,3'-Thiodipropionic acid dioctadecylester (BASF, PS-800)

As shown in Table 1, when comparing a resin composition (comparative example 1) formed of a base resin including plasticized cellulose diacetate and thermoplastic resin with resin compositions (examples 1 to 6) added with a vinylacetal compatibilizer, the tensile strength of the resin compositions were equal to or similar to each other, whereas the elongation and the IZOD impact strength significantly increased due to the addition of the vinylacetal compatibilizer,

Examples 7 to 10 and Comparative Example 2

In order to examine the effects of adding the inorganic filler bonded with silane coupling agent to the base resin including the plasticized cellulose diacetate and the thermoplastic resin in addition to the polyvinylacetal compatibilizer, the resin compositions were manufactured according to the components and the weight ratio as shown Table 2. The properties of each resin composition are shown in Table 2.

TABLE 2

| Division | | Comparative example 1 | Examples 3 | 7 | 8 | 9 | 10 | Comparative example 2 |
|---|---|---|---|---|---|---|---|---|
| Composition (g) | polypropylene[1] | 70 | 70 | 70 | 70 | 70 | 70 | 70 |
| | plasticized CDA[2] | 30 | 30 | 30 | 30 | 30 | 30 | 30 |
| | Polyvinylacetal compatibilizer[3] | — | 15 | 15 | 15 | 15 | 15 | 15 |
| | Silane-treated talc[4] | — | — | 5 | 10 | 15 | 20 | — |
| | Talc | — | — | — | — | — | — | 10 |
| | stabilizer[5] | 0.5 | 0.5 | 0.5 | 0.5 | 0.5 | 0.5 | 0.5 |
| Property | Tensile strength (Mpa) | 34 | 33 | 25 | 25 | 26 | 27 | 25 |
| | Elongation (%) | 15 | 86 | 56 | 50 | 44 | 40 | 36 |
| | Flexural modulus | — | — | 1950 | 2340 | 2510 | 2690 | 2240 |
| | IZOD impact strength (kgfcm/cm) 23° C. | 3.4 | 8.3 | 6.9 | 6.6 | 6.4 | 6.0 | 6.5 |
| | −10° C. | 2.1 | 5.3 | 3.8 | 3.7 | 3.5 | 3.1 | 3.4 |

[1]polypropylene: polymirae, EA5074
[2]plasticized cellulose diacetate: plasticized to weight-average molecular weight of 284,750 g/mol
[3]Polyvinylacetal compatibilizer: degree of acetylation 75 mol %
[4]silane-treated talc: gamma-aminopropyltriethoxysilane surface treated talc
[5]stabilizer: 3,3'-Thiodipropionic acid dioctadecylester (BASF, PS-800)

As shown in Table 2, when comparing the resin composition (comparative example 1) formed of the base resin including plasticized cellulose diacetate and thermoplastic resin with the resin composition (examples 1 to 6) simultaneously added with vinylacetal compatibilizer and silane-treated talc, the tensile strengths of the resin compositions were equal to or similar to each other, whereas the elongation and the IZOD impact strength significantly increased due to the simultaneous addition of the vinylacetal compatibilizer and the silane-treated talc as additives.

Compared with resin composition (Example 3) in which only vinylacetal compatibilizer is used as an additive, when vinylacetal compatibilizer and silane-treated talc were together added, the elongation, the flexural modulus, and the impact strength increased. Also, Example 10 and Comparative Example 2 are resin compositions including silane-treated talc or talc as an additive. In this case, the flexural modulus was increased due to the use of silane-treated talc.

Examples 11 to 13 and Comparative Examples 3 to 5

In order to examine the effects of adding inorganic filler bonded with silane coupling agent and elastomer grafted with maleic anhydride to the base resin including plasticized cellulose diacetate and thermoplastic resin in addition to polyvinylacetal compatibilizer, the resin compositions were manufactured according to the components and weight ratio as shown Table 3 below. The properties of each resin composition are shown in Table 3.

TABLE 3

| Division | | Comparative examples 3 | 4 | 5 | Examples 11 | 12 | 13 |
|---|---|---|---|---|---|---|---|
| Composition (g) | polypropylene[1] | 70 | 70 | 70 | 70 | 70 | 70 |
| | plasticized CDA[2] | 30 | 30 | 30 | 30 | 30 | 30 |
| | vinylacetal compatibilizer[3] | 15 | 15 | 15 | 15 | 15 | 15 |
| | silane-treated talc[4] | 15 | 15 | 15 | 15 | 10 | 10 |
| | elastomer grafted with maleic anhydride[5] | — | — | — | 10 | 20 | 20 |
| | elastomer[6] | 10 | 20 | 30 | — | — | — |
| | stabilizer[7] | 0.5 | 0.5 | 0.5 | 0.5 | 0.5 | 0.5 |
| Property | Tensile strength (Mpa) | 25 | 22 | 21 | 25 | 23 | 21 |
| | Elongation (%) | 49 | 105 | 115 | 92 | 146 | 180 |
| | Flexural modulus | 2350 | 2080 | 1750 | 2410 | 2130 | 1890 |
| | IZOD impact strength (kgfcm/cm) 23° C. | 7.0 | 15.9 | 46.4 | 9.7 | 31.5 | 51.4 |
| | −10° C. | 3.8 | 6.5 | 7.5 | 6.1 | 7.2 | 7.8 |

[1]polypropylene: polymirae, EA5074
[2]plasticized cellulose diacetate: plasticized to weight-average molecular weight of about 284,750 g/mol
[3]Polyvinylacetal compatibilizer: degree of acetylation about 75 mol %
[4]silane-treated talc: gamma-aminopropyltriethoxysilane surface treated talc
[5]elastomer grafted with maleic anhydride: maleic anhydride about 1.0 wt % grafted polyolefin elastomer (EOR-Ethyloctene Rubber)
[6]elastomer: polyolefin elastomer (DOW, ENGAGE8200)
[7]stabilizer: 3,3'-Thiodipropionic acid dioctadecylester (BASF, PS-800)

As shown in Table 3, when the resin compositions (examples 7 to 10) simultaneously include vinylacetal compatibilizer, silane-treated talc, and elastomer grafted with maleic anhydride in addition to the base resin including plasticized cellulose diacetate and thermoplastic resin, the elongation, the flexural modulus, and the IZOD impact strength may significantly increase.

According to an exemplary embodiment of the present invention, a resin composition made with a polyvinylacetal compatibilizer in addition to a base resin including plasticized cellulose diacetate and thermoplastic resin may have improved properties comparable to, or better than, a typical polypropylene resin composition. When additives, i.e., polyvinylacetal compatibilizer, silane surface treated inorganic filler, and elastomer grafted with maleic anhydride are used together in a particular content ratio, the mechanical properties may be further improved.

Accordingly, since the resin composition according to the embodiment of the present invention may replace a typical polypropylene resin composition with eco-friendly materials, the resin composition may be very useful for vehicle interior parts.

Since the plasticized cellulose diacetate (CDA) according to the embodiment of the present invention is extracted from biomaterials such as, for example, wood, the use of CDA as bio mass for the resin may have a beneficial effect on the supply of raw materials compared to a typical polylactic acid (PLA) acquired by fermenting a corn extract.

Due to excellent mechanical properties, the resin composition according to the embodiment of the present invention may have a useful effect as an eco-friendly material in replacing a typical polypropylene synthetic resin composition in a variety of industrial applications. In particular, the resin composition according to the techniques herein may have a useful effect for vehicle interior parts such as a door trim and a pillar trim.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A composition, comprising:
   a base resin of about 100 parts by weight including about 10 wt % to about 50 wt % of a plasticized cellulose diacetate and about 50 wt % to about 90 wt % of a thermoplastic resin; and
   a polyvinylacetal compatibilizer of about 1 to about 20 parts by weight.

2. The composition of claim 1, wherein the plasticized cellulose diacetate has a weight-average molecular weight of about 200,000 to about 500,000.

3. The composition of claim 1, wherein the thermoplastic resin comprises one or more olefines selected from the group consisting of ethylene, propene, butene, pentene, hexene, and cyclohexene.

4. The composition of claim 1, wherein the thermoplastic resin comprises a polyolefin selected from the group consisting of polyethylene, polypropylene, polymethylpentene, and polybutene-1.

5. The composition of claim 1, wherein about 45 mol % to about 85 mol % of the polyvinylacetal compatibilizer is acetalized.

6. The composition of claim 1, further comprising one or more additives selected from the group consisting of a flame retardant, a lubricant, an antioxidant, a light stabilizer, a release agent, a pigment, an antistatic agent, an antimicrobial agent, a processing aid, a metal deactivator, a smoke suppressant, a fluorine anti-dripping agent, an inorganic filler, a glass fiber, a friction-resistant agent, an anti-wear agent, and a coupling agent.

7. A composition, comprising:
   a base resin of about 100 parts by weight including about 10 wt % to about 50 wt % of a plasticized cellulose diacetate and about 50 wt % to about 90 wt % of a thermoplastic resin;
   a polyvinylacetal compatibilizer of about 1 part by weight to about 20 parts by weight;
   an inorganic filler bonded with a silane coupling agent, the inorganic filler ranging from about 1 part by weight to about 40 parts by weight; and
   an elastomer grafted with a maleic anhydride, the elastomer ranging from about 1 to about 30 parts by weight.

8. The composition of claim 7, wherein the plasticized cellulose diacetate has a weight-average molecular weight of about 200,000 to about 500,000.

9. The composition of claim 7, wherein the thermoplastic resin comprises one or more olefines selected from the group consisting of ethylene, propene, butene, pentene, hexene, and cyclohexene.

10. The composition of claim 7, wherein the thermoplastic resin comprises a polyolefin selected from the group consisting of polyethylene, polypropylene, polymethylpentene, and polybutene-1.

11. The composition of claim 7, wherein about 45 mol % to about 85 mol % of the polyvinylacetal compatibilizer is acetalized.

12. The composition of claim 7, wherein the silane coupling agent bonded to the inorganic filler comprises one or more selected from the group consisting of n-butyltrimethoxysilane, n-butyltriethoxysilane, n-hexyltrimethoxysilane, n-hexyltriethoxysilane, n-octyltrimethoxysilane, n-octyltriethoxysilane, n-octyltripropoxysilane, vinyltriethoxysilane, vinyltrimethoxysilane, vinyltris (β-methoxy-ethoxysilane), gamma-glycidoxypropyltrimethoxysilane, and gamma-aminopropyltriethoxysilane.

13. The composition of claim 7, wherein the maleic anhydride-grafted elastomer comprises one or more selected from the group consisting of maleic anhydride grafted polyethylene (MA-g-PE), maleic anhydride grafted polypropylene (MA-g-PP), maleic anhydride grafted ethylene-propylene rubber (MA-g-EPR), maleic anhydride grafted ethylene-octene rubber(MA-g-EOR), and maleic anhydride grafted ethylene-propylene-diene monomer rubber (MA-g-EPDM).

14. The composition of claim 7, further including one or more additives selected from the group consisting of a flame retardant, a lubricant, an antioxidant, a light stabilizer, a release agent, a pigment, an antistatic agent, an antimicrobial agent, a processing aid, a metal deactivator, a smoke suppressant, a fluorine anti-dripping agent, an inorganic filler, a glass fiber, a friction-resistant agent, an anti-wear agent, and a coupling agent.

15. A product formed of the composition according to claim 1.

16. A product formed of the composition according to claim 7.

* * * * *